United States Patent [19]

Melcher et al.

[11] 4,154,585
[45] May 15, 1979

[54] FLUIDIZED BED PARTICULATE COLLECTORS

[75] Inventors: James R. Melcher, Lexington; Jeffrey C. Alexander, Somerville; Karim Zahedi, Brookline, all of Mass.

[73] Assignee: Massachusetts Institute of Technology, Cambridge, Mass.

[21] Appl. No.: 781,599

[22] Filed: Mar. 28, 1977

[51] Int. Cl.$^2$ .................... B01D 46/32; B03C 9/02
[52] U.S. Cl. ............................................. 55/99; 55/10; 55/122; 55/138; 55/262; 55/466; 55/474; 110/222; 110/245; 110/263; 110/345; 422/142; 422/144
[58] Field of Search .......................... 55/5–8, 55/10, 99, 122, 126, 138, 262, 338, 474, 77, 79, 91, 233, 466; 118/620, 630, DIG. 5; 110/28 R, 28 L, 119, 222, 245, 263, 345; 423/215.5, DIG. 16; 23/288 S, 313 FB; 204/164; 422/142, 144

[56] References Cited

U.S. PATENT DOCUMENTS

| | | | |
|---|---|---|---|
| 2,355,016 | 8/1944 | Stein, Jr. | 23/288 S |
| 3,094,409 | 6/1963 | Renzoni et al. | 55/6 |
| 3,304,249 | 2/1967 | Katz | 204/164 |
| 3,431,892 | 3/1969 | Godel | 110/28 R |
| 3,515,381 | 6/1970 | Foch | 110/28 R |
| 3,719,029 | 3/1973 | Suzukawa et al. | 55/233 |
| 3,940,237 | 2/1976 | Gonzales et al. | 55/99 |
| 4,033,117 | 7/1977 | Smith | 55/99 |
| 4,038,049 | 7/1977 | Melcher et al. | 55/138 |
| 4,038,052 | 7/1977 | Melcher et al. | 55/138 |
| 4,058,374 | 11/1977 | Juntgen et al. | 55/79 |
| 4,078,041 | 3/1978 | Morris | 423/215.5 |

*Primary Examiner*—Frank W. Lutter
*Assistant Examiner*—David L. Lacey
*Attorney, Agent, or Firm*—Arthur A. Smith, Jr.; Robert Shaw

[57] ABSTRACT

A fluidized bed, particulate collector system wherein, in one embodiment, the bed particles have applied thereto at the surface thereof, an additive that serves to adhere particulate, once collected, to the bed particles. The bed particles and/or additive may be combustible or may be incombustible. In one embodiment, the system includes two fluidized beds, in tandem, the first of which collects particulate mostly in the supermicron sizes and the second of which is an electrofluidized bed that collects particulate mostly in the submicron sizes.

13 Claims, 7 Drawing Figures $$m_f = \eta_b m_f + m_s$$
$$m_i + \eta_b m_f = \eta_{f1} m_i + \eta_{f2} \eta_b m_f + m_f$$

MASS BALANCE EQUATIONS

FLUIDIZED BED PARTICULATE COLLECTORS

The present invention relates to fluidized bed collectors that may be employed, by way of illustration, to remove fly ash, smoke and/or dust and the like from combustion gases.

By way of background, attention is called to applications for Letters Pat. Ser. No. 516,056 (Melcher et al) filed Oct. 18, 1974 (Now U.S. Pat. No. 4,038,052) and Ser. No. 516,057 (Melcher et al), filed Oct. 18, 1974, (now U.S. Pat. No. 4,038,049) as well as to the prior art referred to in the two applications. Both patents are assigned to the Massachusetts Institute of Technology of Cambridge, Mass. Conventional electrostatic precipitators (ESP) that have served so well for so long are proving uneconomical in removing submicron and other particulate from gases. The electrofluidized bed (EFB) in said Ser. No. 516,057 is particularly suited to removal of the submicron fly ash, smoke, and/or dust from gases, whether the effluent be from oil or coal, but in the EFB system there can arise the problem of disposing of the bed particles plus the collected particulate. A very important object of the present invention addresses that problem by providing as bed particles for the EFB, combustible particles, which, together with collected particulate, are burned in a combustor and collected as solid ash in the combustor.

It has been found by the present inventors that pulverized coal can be employed as particles of a fluidized bed and that retention of particulate, once collected upon the bed particles of the fluidized bed, is greatly enhanced by a liquid film upon the surface of the particles. Accordingly, another object of the invention is to provide a surface film as a liquid additive to the bed particles of a fluidized bed collector whether electrofluidized or simply fluidized.

The EFB of said Ser. No. 516,057 does a remarkable job in removing particulate, supermicron as well as submicron in size, from the gaseous effluent, but there is a tendency for the electric field mechanism used to charge particulate prior to entry into the bed region, to be fouled by the large particulate. It is still another object, therefore, to provide a fluidized bed collector system wherein the supermicron sizes of particulate are removed from a gaseous effluent prior to entry into a charging region.

These and still further objects are addressed hereinafter.

The foregoing objects are achieved in a fluidized bed collection system that includes at least one bed of particles through which a gaseous medium is passed with a vertical component of flow to effect fluidization of the particles. The particles may be, and in an important aspect of the invention are, combustible; and in a very important aspect there is applied to the surface of the particles an additive to enhance adherence of the particulate, once collected, to the particles. The particles of the bed may be placed in an electric field, to provide an EFB, and the particulate is charged prior to entry into the bed region. In such case, it has been found to be advantageous to place a fluidized bed upstream of the EFB to collect supermicron sizes of particulate prior to entry into the region wherein the particulate is charged.

The invention is hereinafter described with reference to the accompanying drawing in which.

Figure 1:
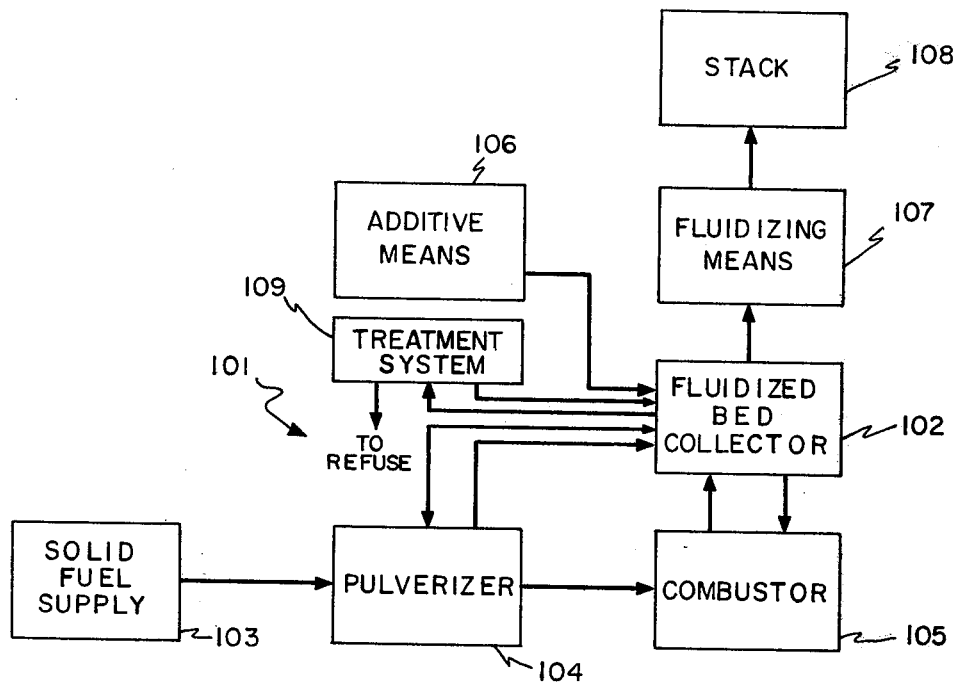
FIG. 1 is a representation, in block diagram form, of a system that includes a fluidized bed particulate collector of the present invention.

It should be apparent that the present disclosure is multi-faceted; some aspects of the particulate collectors herein disclosed apply to electrofluidized (EFB) collectors, but some aspects are not so limited. In the detailed description hereinafter the various ramifications are taken up in detail, but first there follows a general discussion to place the collectors of the invention in proper context; the general discussion applies mostly to coal-burning systems wherein a fluidized bed collection system serves to remove fly ash from stack gases.

Many types of coal-fired combustors exist or are proposed and it is probable that the optimal design of an effective EFB particulate control system will depend on the type of combustor with which it is to be used. For conventional boiler furnaces, two of the most important distinctions are those of dry bottom vs. wet bottom units and the ash retention of the furnace. Wet bottom units are operated such that the furnace wall temperatures are above the melting point of the ash; thus, ash collected on the walls is molten and runs to the bottom as a liquid (called slag). Dry bottom units are just the opposite; the ash remains solid, even at the bottom of the furnace, whence it is removed. In general, wet bottom units have higher ash retention than dry bottom units, ash retention being the fraction of total ash retained in the furnace. Highest ash retention (up to 90%) is exhibited in so-called cyclone furnaces, while for dry bottom units the ash retention is as low as 10-20%. Of potential future use are fluidized bed coal combustors; such combustors have shown ash retentions comparable to cyclone furnaces.

The unique problems for control of fly ash from coal combustion stem from the variability of coal compositions and the high ash content (as compared to oil) of the coal. Typical gas loadings of fly ash range from 5-10 gm/m$^3$, and for typical 1000 mw power plants many tons of ash are produced each hour. To make matters worse, a significant portion of this fly ash is in the submicron range, rendering it very difficult to collect in conventional control systems. Expensive electrostatic precipitators (ESP) have been used with varying degrees of success in the collection of coal fly ash. They are not economical, though, in collecting the highly resistive fly ash which results from the combustion of low sulfur coal.

It is expected that an EFB control system would not be hindered by the same ash resistivity problems typical of an ESP. However, the state of the prior art in EFB technology leaves open several vital operational questions in the collection of fly ash. An efficient charging system for dusts of such high loading, prior to the present teaching, has not been demonstrated. Such a system must charge all the dust particles, and be able to operate indefinitely in time. The retention (or adhesion) of the dry particulate, once collected, must be assured, and the removal of the high quantities of collected ash must be done efficiently (and in a steady state mode of operation). The collection system herein disclosed offers solutions to these problems.

Turning now to FIG. 1, the overall system labeled 101 includes a combustor 105 to burn a fuel such as, for example, a solid fuel such as coal from a solid fuel supply 103. The coal, in the system 101, is reduced to particles by a pulverizer 104 and conveyed to the combustor 105. A small amount of the coal particles is blown or otherwise delivered to a bed in a fluidized bed collector 102 to provide bed particles, as later discussed. Smoke from the combustor 105 is drawn by natural draft and-/or fluidizing means 107 (which may be a fan or blower or the like) through the collector 102 wherein particulate is removed from the smoke by particles in the fluidized bed, and cleansed air is delivered to a stack 108. In a preferred embodiment of the present system, fuel oil or some other additive is continuously deposited as a liquid film, in situ, upon the bed particles; the film, as later discussed, serves to adhere the particulate to the bed particles. In a preferred system, the combustible particles, with combustible liquid thereon and including particulate collected upon the combustible bed particles, are fed back directly to the combustor 105 or, indirectly, through the pulverizer 104. In an operating system, the fluidized bed collector 102 can be incorporated in the stack or, preferably, it can be located as a separate unit ahead of the stack in the way shown in FIG. 1.

Figure 2:
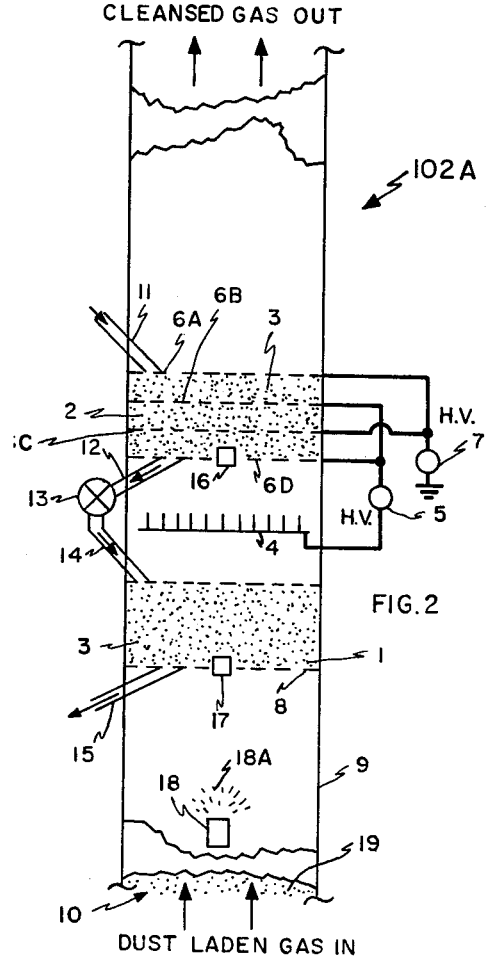
FIG. 2 is a diagrammatic representation showing two fluidized beds within a vertically oriented, cylindrical housing, the housing being cutaway to show the inner active elements which are shown in schematic form.

Previous mention is made of a problem in electrofluidized beds, in that the mechanism that charges particulate in the smoke or dust laden gas is rendered inoperative by supermicron size particulate after some period of operation. The fluidized bed collector shown at 102A in FIG. 2 is adapted to address the contamination problem.

The collector 102A consists of a first fluidized bed 1 that serves to collect dust or other particulate 19, mostly in the supermicron size range, from a dust laden gas that is delivered at the lower end marked 10 of a vertically oriented cylindrical housing 9 that contains the first bed 1 and a second fluidized bed 2, the latter being an electrofluidized bed of the type designated coflow in said application Ser. No. 516,057 and described in great detail therein. While the bed 2 can remove supermicron size particulate from the gas, it is particularly well adapted to remove submicron particulate, a fact which is gone into in depth in the earlier application.

In the two-bed or two-stage collector system, beds 1 and 2 are disposed in tandem or series such that incoming gas containing entrained particulate moves as a fluid stream (having a vertical component in the region occupied by the two beds) through the first bed 1 and then through the second bed 2 to effect fluidization of the particles shown at 3 of the first particle bed and the second particle bed. The hot gas effluent from the combustor, then, not only delivers the gas (containing entrained particulate) to the collector 102A, it also effects fluidization of the bed particles 3 to create a fluidized bed. As previously noted, the bed 1 removes a high percentage of the supermicron particulate in the fluid stream and the removal process is mostly mechanical.

Charging means comprising a corona charging grid 4, disposed between the first particle bed 1 and the second particle bed 2, and a source of high voltage 5, acts to electrify that particulate remaining in the gas after passage through the first particle bed (typically at least 95% of the particulate is removed by the first bed 1 and almost all the supermicron size). Means for imposing an electric field comprising grids 6A–6D and a source of high voltage 7 act to polarize the particles 3 of the second particle bed 2 to create an electrofluidized bed (EFB) collector. The lowermost grid 6D performs a distributor plate function, that is, it supports the bed particles within the region of the bed (interacting, in this connection, with the walls of the housing 9), and the apertured plate marked 8 performs the same function for the bed 1 (see said application Ser. No. 516,056 for details on distributor plates). The particles 3 of both beds 1 and 2 now being discussed are coal particles; this aspect of the invention is described in greater detail in the next few paragraphs.

Fresh bed particles, which in the system discussed at this juncture are coal particles, are introduced through a chute 11 to the second bed 2 (or second stage of the two-stage system shown). The particles that form a fluidized bed are levitated by the fluidizing gas and more about with motions that are analogous to those of a boiling liquid. Typically, the coal particles are sifted to introduce particle sizes of about 2 mm or less to the bed 2, the particles 3 being large enough so as not to elutriate from the bed and small enough to permit levitation thereof without excessive vertical gas movement; as is shown in the earlier application, Ser. No. 516,057, the higher the velocity of the levitating gas, the greater the tendency of collected particulate to be dislodged from the collecting particles or not to be collected at all. (Levitation is related also to particle density.) The heaviest particles gradually migrate to the bottom of the bed 2 whence they are conveyed by a duct 12, through a variable-opening valve 13 and a further duct 14 to the bed 1. Eventually, the largest particles (i.e., the bed particles with aggregated particulate attached thereto) are removed through a duct 15 and transported, say, to the combustor 105 or to some other combustor. Rappers 16 and 17 dislodge particles that may become attached to the distributor plates 6D and 8, respectively.

To assure adhesion of the dry fly ash, a mist of oil droplets 18A is introduced into the gas stream by an oil atomizer 18. Only very small amounts of oil are necessary (on the order of 1% of the ash collected by weight), but its presence is vital to the operation. The oil is collected on the bed particles 3 of both beds and acts as a binding agent for the ash.

An important feature of the system, as above discussed, is the use of coal particles as the bed seed materials. Typically mm sized particles will be used and will be obtained from crushing the sifting the coal to be combusted. The electrical conductivity of coal varies. But, for most U.S. coals, the conductivity is well within the ranges of practical EFB operation. Fresh coal particles, as above indicated, are fed in at the top of the second stage EFB. They are removed from the bottom and then introduced to the top of the first stage. Finally, when the particles are coated with enough ash that the agglomerates are too large to remain fluidized, they are removed from the bottom of the first stage. This size classification is performed naturally in a fluidized bed, with larger particles settling to the bottom, but may be aided by making the bed cross sectional area smaller at the bottom of the bed. Such size classification has been performed successfully by other workers.

The coal seeded ash agglomerates thus formed are then introduced into the combustion zone where the coal seed and the oil adhesive are combusted, and for the most part, the ash is dropped to the bottom of the combustor. As a result, no net expense is incurred by the use of the coal seed particles and the oil additive, as their heating values are utilized in the combustor. Also, any unburnt combustibles in the ash have another chance to be combusted; thus, the thermal efficiency of the boiler may improve.

Naturally occurring coal tars may be utilized as the adhesive agent. For that matter, any liquid may be injected for adhesive purposes. Water might be an alternative for the first stage collector 1, but would tend to short out the EFB collector 2.

The EFB stage may be in either the co-flow (as shown in FIG. 2) or the cross flow configuration discussed in said application Ser. No. 516,057. Also, alternating (ac) or direct (dc) field may be used in the bed 2 and/or charging sections. Further, electromechanical effects (produced by electric field forces on the bed particles) may be utilized to influence collection dynamics (via bubble breakup) or solids mixing for particle flow control in either (or both) stage(s) of the system.

The conductivities of bed components or particles 3 are fundamental issues to effective EFB operation. The conductivity of coal depends on the presence of low molecular weight compounds which act as insulators between carbon units of low resistivity. Upon thermal decomposition these low-molecular weight components are volatilized, allowing the solid residue to become semiconducting. Typical bituminous coals have resistivities around $10^{12}\Omega$-m (as measured for a powdered coal) at 25° C.

Ash resistivity has been studied in some depth as a result of its importance to ESP operation. The expected resistivities of both coal and ash are high enough that electric current dissipation in the EFB is negligible. The exact values of resistivity are important, however, when electromechanical effects need to be considered.

The use of modest to high electric fields in fluidized beds of semi-insulating particles can radically alter the mechanical nature of the bed. In cross flow beds, as the applied field is increased, strings of particles form across the bed. These strings can cut right through bubbles and destroy their structure. Since mixing the bed particles depends upon particle transport via the wake region of the bubble, the axial mixing of the bed particles can be all but stopped. Beds, once fluidized, can even be "frozen" in their expanded states. Very often, though, channel formation accompanies these mechanical effects resulting in poor collection performance.

Figure 7:
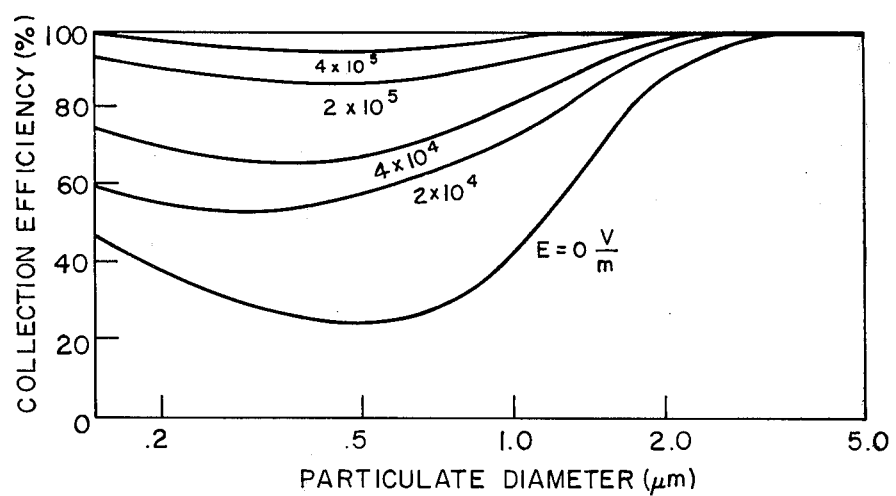
FIG. 7 is an experimental plot of typical EFB collection efficiency as a function of particulate diameter and applied electric field.

The collection of particulate 10 in a fluidized bed can be analyzed by first determining collection on a single bed particle. The separate mechanisms of diffusion, interception, impaction and electrostatic attraction are considered to act in a flow modeled to account for the effect of surrounding particles. When these efficiencies are used in a plug flow model of the bed, overall bed collection efficiencies can be determined. Experimental results of particulate collection efficiencies for a typical EFB collector are shown in FIG. 7. It should be noted that with no electric field applied, the beds act as an efficient collector only for supermicron particulate. With field applied, all particle sizes can be collected with high efficiencies. Adhesion of the collected particulate to the bed particle is assured here.

Naturally occurring adhesion forces, such as electrostatic attraction and Van der Walls forces, are often not sufficient to hold the collected ash to the bed particle under strain of dislodging forces resulting from particle collisions in the bed. It has been shown by the present inventors that small amounts of liquid aerosol (which is collected in the bed) act as an adhesive agent. The liquid, once collected, is drawn to the contact points of the collected ash, thus forming bridges at these points. The removal of ash particulate necessitates the elongation of these bridges, an action opposed by the viscosity of the liquid. Capillary forces tend to pull the ash particulate back towards the contact point, thus retaining the particulate. The amount of liquid (usually an oil) additive necessary for assured adhesion depends on the ash particulate size, the intensity of collisions in the bed, and the viscosity of the liquid. It has been found experimentally that oil in quantities as little as 1% of the mass of the ash collected can assure adhesion in typical beds. This number is roughly supported theoretically. It is important that the injected oil be deposited between the two stages in quantities proportional to the respective quantities of ash collected. To such an end, the size spectrum of the injected oil (i.e., the droplets 18A in FIG. 2) can be chosen correctly, with supermicron droplets collected in the first stage and submicron in the second stage. It is simplest just to match the size distribution of the injected oil to that of the ash.

Figure 6:
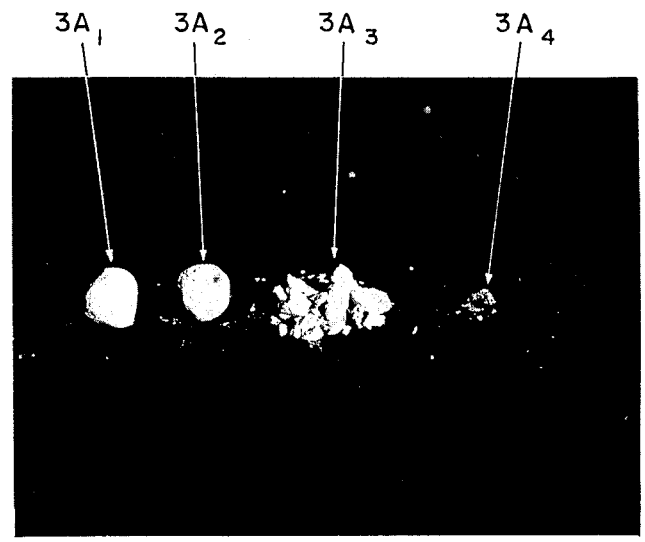
FIG. 6 is a photograph showing two particles of fly ash, a third particle of fly ash which has been crushed, and a particle of coal, all of the particles being enlarged in the photograph.

The build-up of coal ash agglomerates is the most important issue disclosed here. With 1% oil additive, agglomerates about twice the original coal particle diameter have been built up, as shown in FIG. 6. The only limitation to appear has been the defluidization of the bed due to the increase in particle size. Such a criterion can be used to judge the particle residence time in the system for a single particle. As a benchmark, one can find the time it takes for a bed to collect its own weight in ash. Given a bed with an overall depth of ten cm (sum of the two beds) with the bed mass density of $10^6 gm/m^3$, a fluidizing flow velocity of 1 m/sec. and a typical ash loading of 10 gm/m$^3$, this time is on the order of two to three hours. Thus each coal particle can be expected to reside in the system for a couple of hours before it would grow to twice its original mass.

When a typical bituminous coal particle is heated for combustion, 30–40% of its initial weight is driven off by thermal decomposition or de-volatilization. At a temperature above 650° C. and in the presence of an oxidizing atmosphere these volatiles burn at a fast rate compared to their evolution. For mm sized coal particles this complete evolution and combustion time is on the order of a fraction of a second. It has been observed that if the coal particle is coated with fly ash, the evolution of volatiles causes the agglomerate to explode, thus freeing the coal particle. The combustion of the remaining char (fixed carbon) is a much slower process. For large char particles (greater than 50 μm) the diffusion of oxygen to the char particle surface is the controlling rate process. The reaction rates depend on the temperature and oxygen content of the gas, but roughly speaking the burn-out of a mm sized char particle is characterized by a time of 1-10 sec. (with excess air of about 20%). Such large particles may burn too slowly for complete combustion in the furnace; so the re-injected coal-ash agglomerate may first have to be pulverized or may have to be burnt in a special separate combustor. (However, coal particles for fluidized bed combustion are just the size of those proposed for the EFB system herein and then complete burnout is likely without further pulverization). In FIG. 6 there are shown particles $3A_1$, $3A_2$ and $3A_3$ which are agglomerates, that is, bed particles 3 with fly ash adhered thereto; the particle $3A_3$ has been crushed. The particle labeled $3A_4$ is, in fact, a coal particle which serves as seed for the fluidized bed.

The overall system performance for a system with ash-coal agglomerate recirculation can be analyzed from a knowledge of the ash retention ($\eta_f$) in the combustor and the collection efficiency ($\eta_b$) of the EFB system. It is possible that the recirculated ash is collected in the combustor with a different efficiency than the ash with the primary coal injection. The primary ash retention is termed $\eta_{f1}$ in FIG. 3 and hereinafter and the secondary ash retention $\eta_{f2}$.

Figure 3:
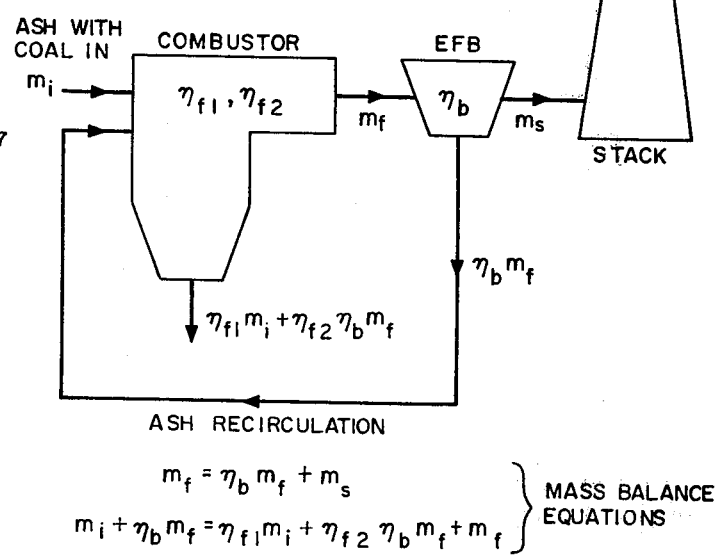
FIG. 3 is a representation in block diagram form showing a feedback scheme.

Two important parameters are defined in FIG. 3 to analyze the system. The ratio of the mass flow rate of ash exiting the combustor to that entering, with the primary pulverized coal, $m_f/m_i$, is a measure of dust loading in the gas incident to the EFB collector. Values in excess of one are to be avoided as they indicate the necessity of repeated collection of the same ash and the associated expense (mainly for oil additive and material handling). The overall system ash collection efficiency $\eta_{overall}$, is derived from the ratio of ash mass flow rate up the stack to ash mass flow into the combustor with the primary pulverized coal, $m_s/m_i$, by $$\eta_{overall} = 1 - m_s/m_i$$

The total ash removal efficiency by the entire system is measured by $\eta_{overall}$. If 100% of the ash collected in the EFB is recirculated to the furnace the steady state values of these parameters are determined from system mass conservation statements (see FIG. 3).

$$\frac{m_f}{m_i} = \frac{1 - \eta_{f1}}{1 - n_b(1 - \eta_{f2})}$$

$$\frac{m_s}{m_i} = \frac{(1 - n_b)(1 - \eta_{f1})}{1 - n_b(1 - \eta_{f2})}$$

When the coal ash agglomerates are recirculated directly, it is likely that $\eta_{f2} = 1$ since the recirculated ash will be in large agglomerates which will fuse in the furnace and assuredly drop to the bottom. In such a case:

$$m_f/m_i = (1 - \eta_{f1})$$

$$\eta_{overall} = 1 - (1 - \eta_b)(1 - \eta_{f1})$$

Figure 4:
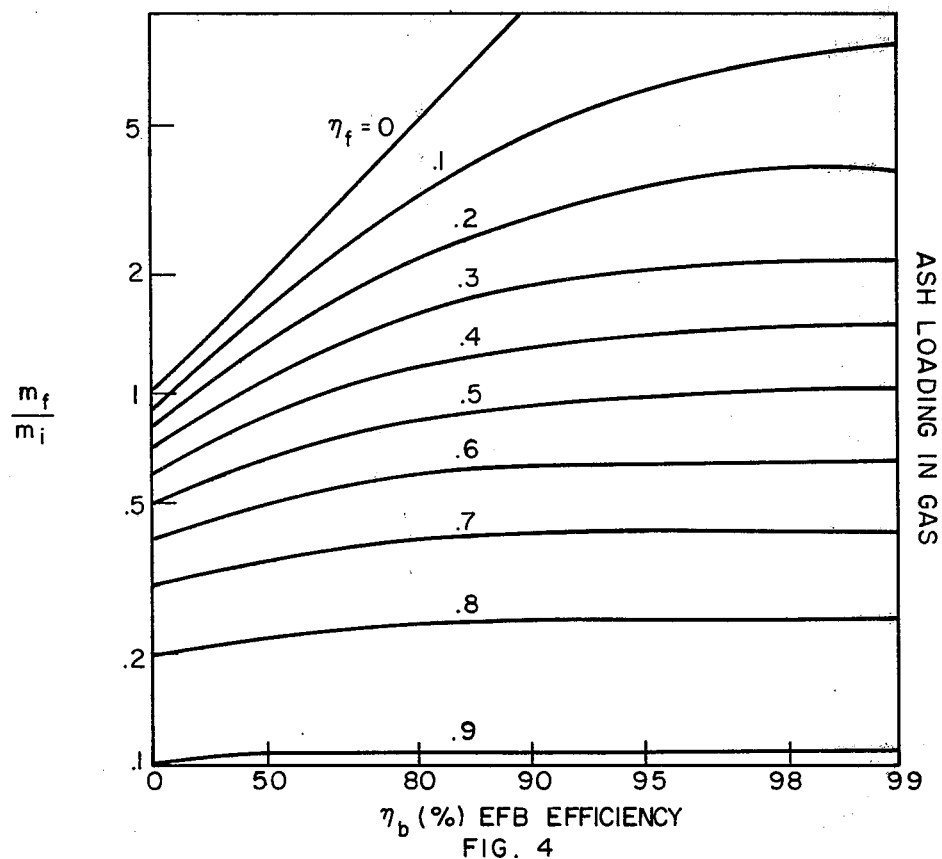
FIG. 4 is a theoretical plot of relative dust mass loading to the fluidized bed particulate collector of FIG. 3 as a function of the bed collection efficiency and combustor retention efficiency.
Figure 5:
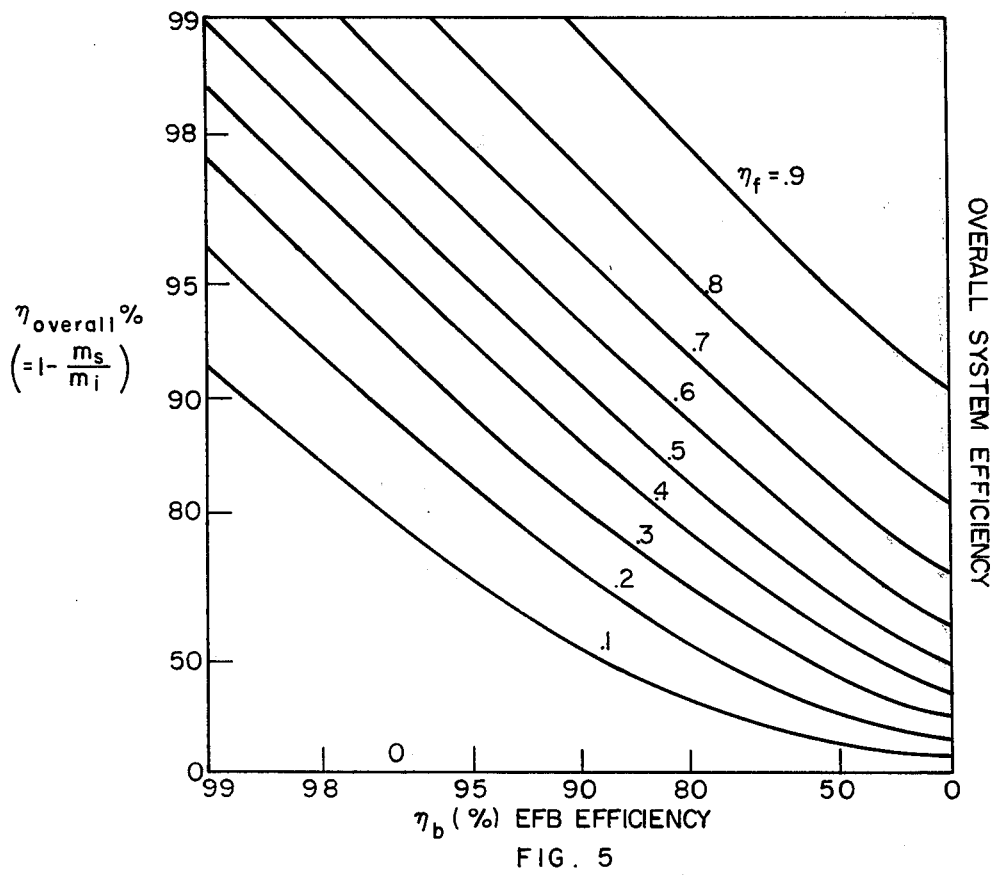
FIG. 5 is a theoretical plot of the overall system collection efficiency of the system shown in FIG. 3 as a function of the bed collection efficiency and combustor retention efficiency.

The performance is then essentially that of two collectors in series. If the coal-ash agglomerate is pulverized before injection, it is likely that the secondary ash retention is equal to the primary ash retention or $\eta_{f1} = \eta_{f2} = \eta_f$. FIGS. 4 and 5 show plots of $m_f/m_i$ and $\eta_{overall}$ as functions of $\eta_b$ with $\eta_f$ as a parameter. It can be seen that to eliminate excessive dust loadings, the furnace ash retention should be at least 50%. In this range, high overall efficiencies are also achieved.

The fly ash control system above presented herein offers two principal advantages over the ESP. First, is its effectiveness of operation whatever the nature of the ash. For low sulfur Western coals with reduced sulfur oxide emissions, ESPs have failed in collecting the high resistivity fly ash that results. Further, the EFB offers improved ease of handling of the collected particulate. Many ash handling operations are aimed at pelletizing the ash. A major problem of ESPs is the removal of collected ash from the plates, which may be difficult if the ash is sticky, or may lead to reentrainment upon rapping, neither of which is a problem in the EFB.

Second, the EFB offers potential economic advantages over ESPs and other alternatives such as bag filters. Gas residence times in EFBs are more than an order of magnitude less than for ESPs of equivalent theoretical collection efficiencies. Since residence time is a rough measure of device size and device size is a rough measure of device capital cost, the advantage here is obvious. Since the system proposed here requires no net expense for operating materials (the coal seed particles and the oil additive are eventually combusted, so their cost is not attributable to the EFB collection system), and may even slightly improve thermal efficiencies (by complete burn-out of combustibles from the recirculated ash), these operating expenses appear negligible. The expenses for the greater pressure losses of an EFB and the probably more sophisticated ash handling facilities do not appear to be excessive.

The flexibility of the proposed system, as indicated in the many permutations suggested, indicates that the EFB system may be tailor-fitted to a specific requirement, and the system may have many uses outside the steam boiler ash collection use indicated herein.

Although coal can be used as the seed material in the beds 1 and 2, sand, granulated slag, or other incombustible materials may be used, and the resulting agglomerate may be introduced to the furnace or other combustor 105 or treated separately (e.g., by sintering or melting in the treatment system labeled 109 in FIG. 1), or the particles removed from the bed may be simply disposed of. Alternatively, the agglomerate formed in the bed 1 may be removed, fused, crushed and/or sized in the treatment system 109 and then be returned to the beds 1 and 2 as seed; or some or all of the treated agglomerate may be delivered to refuse or waste.

The above and still further modifications of the invention herein disclosed will occur to persons skilled in the art and all such modifications are deemed to be within the scope of the invention as defined by the appended claims.

What is claimed is:

1. Apparatus that includes a combustor that receives or produces ash and an electrofluidized bed particulate collection system acting in combination, said collection system comprising a bed of particles; means to impel a hot gas, from which said particulate is to be collected as an ash agglomerate upon the bed particles, from said combustor and through the bed to effect fluidization of the particles of the bed; means providing an electric field in the region occupied by the bed to effectively polarize the bed particles; electric field means positioned to electrify the particulate prior to introducing the particulate to the bed region; means continuously depositing an insulating liquid film in situ upon the bed particles, said liquid film serving to effect adherence of the particulate to the bed particles; and means to feed back said bed particles with liquid thereon and including particulate collected upon said bed particles to the combustor for combustion thereof of said particulate, said hot gas including at least in part combustion effluents from said combustion, said combustor having a secondary ash retention $\eta_{f2} \gtrsim 0.50$, wherein the secondary ash retention $\eta_{f2}$ is the retention for that part of the ash introduced to the combustor from the electrofluidized bed.

2. Apparatus as claimed in claim 1 wherein the particles are coal particles.

3. Apparatus as claimed in claim 2 wherein the liquid is fuel oil.

4. Apparatus as claimed in claim 3 wherein said means continuously depositing is operable to introduce the fuel oil to the bed as an aerosol comprising fuel oil droplets.

5. Apparatus as claimed in claim 1 wherein the combustor is a fluidized bed combustor.

6. A particulate collection system that includes two fluidized particle beds acting in combination in a tandem system wherein the first bed of the two beds is a fluidized bed collector that serves to collect particulate mostly in the supermicron range on bed particles thereof and in which the second bed of the two beds is an electrofluidized bed that serves to collect particulate mostly in the submicron range on bed particles thereof, said system comprising means operable to pass a gaseous medium through the first bed with a vertical component to fluidize the particles of the first bed and then through the second bed to fluidize the particles of the second bed, and electric field means disposed in the region between the first bed and the second bed to electrify the particulate prior to introducing the particulate to the second bed.

7. A fluidized bed, particulate collection system is claimed in claim 6 wherein the bed particles are combustible particles.

8. A fluidized bed, particulate collection system as claimed in claim 6 wherein the bed particles are incombustible particles.

9. Apparatus as claimed in claim 6 that includes means introducing a liquid additive to said particles of both beds to promote adhesion of the particulate to the bed particles.

10. Apparatus as claimed in claim 9 wherein said particles are combustible.

11. Apparatus as claimed in claim 9 wherein said particles are incombustible.

12. In a fluidized bed system operable to collect particulate from a fluidizing gas, particle bed means comprising bed particles, means passing a fluidizing gas through the particle bed means, means introducing a liquid additive to said bed particles to promote adhesion of the particulate to the bed particles, a treatment system, means to deliver the bed particles with particulate adhered thereto to form thereby an agglomerate from the fluidized bed to the treatment system to be processed therein and to return the processed agglomerate to the fluidized bed means as bed particles, said treatment system including means to fuse the agglomerate and crush the same, the crushed agglomerate being returned to the fluidized bed means as bed particles.

13. A method of collecting particulate, that comprises, forming a bed of particles, directing a gas containing said particulate entrained therein through the bed with a vertical component to fluidize said particles and provide a fluidized bed, and introducing a liquid into the bed region in the form of droplets, the droplets being collected upon the particles of the bed and effecting adherence of particulate collected on bed particles to the collecting particle, the size spectrum of the liquid droplets being matched substantially to the size spectrum of the particulate being collected.

* * * * *